United States Patent [19]
Goering et al.

[11] Patent Number: 6,094,898
[45] Date of Patent: Aug. 1, 2000

[54] FLEXIBLE FINGER INSERTS FOR COTTON STRIPPER FINGERS

[75] Inventors: Kevin Jacob Goering, Cambridge; Timothy Arthur Deutsch, Newton; David Carl Winter, Johnston, all of Iowa

[73] Assignee: Deere & Company, Moline, Ill.

[21] Appl. No.: 09/198,744

[22] Filed: Nov. 24, 1998

[51] Int. Cl.[7] .................................................. A01D 46/12
[52] U.S. Cl. ..................................... 56/34; 56/37; 56/127
[58] Field of Search ................................... 56/33, 34, 37, 56/29, 28, 127, 330

[56] References Cited

U.S. PATENT DOCUMENTS

| | | | |
|---|---|---|---|
| 131,124 | 9/1872 | Sims | 56/34 |
| 3,067,561 | 12/1962 | Jezek | 56/34 |
| 3,380,232 | 4/1968 | Jezek | 56/34 |
| 3,402,537 | 9/1968 | Jezek | 56/34 |
| 3,408,800 | 11/1968 | Jezek | 56/34 |
| 3,509,700 | 5/1970 | Jezek | 56/34 |
| 3,729,909 | 5/1973 | Gray et al. | 56/34 |
| 3,772,863 | 11/1973 | Jezek | 56/34 |
| 4,358,921 | 11/1982 | Pustejovsky | 56/34 |
| 5,313,771 | 5/1994 | France, et al. | 56/33 |

*Primary Examiner*—Robert E. Pezzula
*Assistant Examiner*—Arpad Fabian Kovacs

[57] ABSTRACT

A flexible insert for a cotton stripper finger assembly adapted for stripping cotton bolls from cotton plants planted in narrow row or broadcast configuration. The insert comprises a flexible plastic strip sandwiched between a conventional metal stripping finger and a metal hold-down member. The insert has edges extending outwardly from the metal stripping finger edges to reduce the effective width of the gap between fingers to more efficiently strip cotton bolls from cotton plants having relatively thin stalks. The portions of the insert which project beyond the metal stripping finger are sufficiently flexible to permit efficient stripping of cotton plants with thicker stalks. Since the effective gap width can change with changing plant conditions, the need to change gap-adjusting inserts is eliminated. The plastic material, which preferably is polyurethane having a durometer of approximately 93, resists sap build-up and improves cotton flow over the fingers.

17 Claims, 2 Drawing Sheets

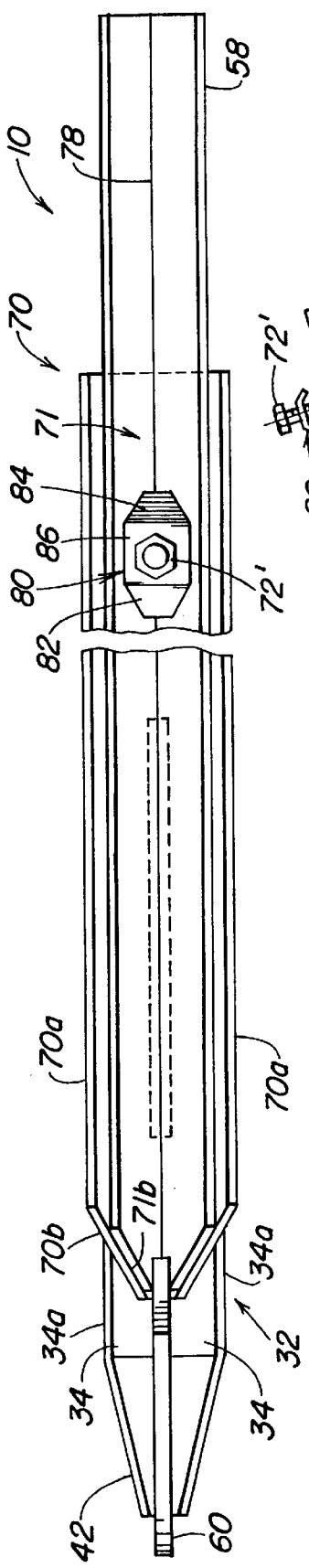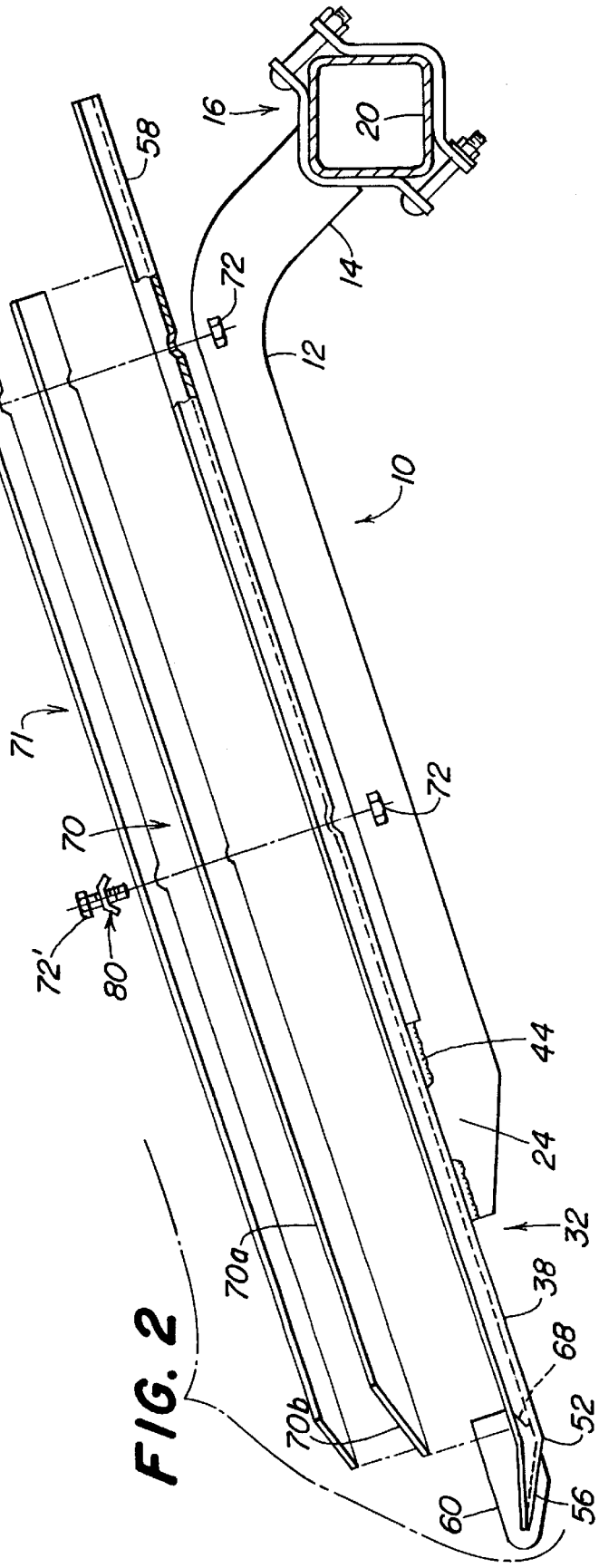

FLEXIBLE FINGER INSERTS FOR COTTON STRIPPER FINGERS

BACKGROUND OF THE INVENTION

1) Field of the Invention

The present invention relates generally to cotton harvesters, and, more specifically, to a finger assembly for a finger type cotton stripper.

2) Related Art:

With advances in weed control, an increased number of cotton growers are switching from parallel row cotton to broadcast cotton. Presently, broadcast cotton is harvested using a finger-head attachment on a self-propelled cotton stripper. A typical finger-head attachment is shown in U.S. Pat. No. 4,358,921 assigned to Allis-Chalmers.

Cotton plant size variations require that the spacing between fingers be adjustable to provide a gap that matches the cotton stalks. If the gap is too wide, cotton stripping efficiency is reduced. A gap that is too narrow for the stalk causes stalk barking and deterioration in the cotton grade, and cotton stalks can be pulled from the ground. The U.S. Pat. No. 4,358,921 patent shows V-shaped finger attachments that are bolted to the fingers to adjust the gap. Another type of V-shaped finger attachment is shown in co-pending and commonly assigned application Ser. No. 09/153,388 filed Sep. 15, 1998 and entitled "Single Bolt Stripping Finger Insert". Such V-shaped or angle type fingers and attachments provide gap adjustability but tend to cause barking of the cotton plant and deterioration of the cotton grade. To adjust the gaps, numerous bolts have to be removed and reattached to add or change a large number of inserts. Adjusting the gaps for differing crop conditions is therefore very time consuming and inconvenient.

Maintaining a steady flow of stripped cotton over the finger assemblies and upward at the aft end of the assemblies for delivery to the cross auger is necessary. The steel stripping finger can rust, and rusted fingers resist cotton feeding thereby increasing blockage problems. The steel fingers also get gummed with layers of cotton plant sap which reduces stripping efficiency and causes further blockage problems. Various plastic coated inserts have been provided to reduce barking, but such inserts typically consist of plastic-coated metal members which are expensive to manufacture and which do not accommodate different plant conditions. Changing conditions may require different sized inserts, and a time-consuming insert changing operation still has to be performed. Providing a low-cost stripper finger assembly that has good continuous cotton flow characteristics and delivery characteristics with reduced plant damage in differing crop conditions has been a continuing source of difficulty.

BRIEF SUMMARY OF THE INVENTION

It is therefore an object of the present invention to provide an improved stripper finger assembly for a cotton harvester. It is a further object to provide such an assembly which overcomes most or all of the aforementioned problems.

It is a further object of the present invention to provide an improved stripper finger assembly which accommodates variations in plant size. It is another object to provide such an assembly which does not require filler replacement to change the stripping gap for different crop conditions.

It is still another object of the present invention to provide an improved insert for a stripper finger assembly which reduces cotton plant barking. It is yet another object to provide such an insert which improves cotton flow, resists sap build-up, and does not rust. It is another object to provide such an insert which is inexpensive and easy to attach and remove. It is a further object to provide such an insert which flexes to accommodate different plant conditions and which has a low coefficient of friction.

A cotton stripping finger assembly includes a flexible plastic insert sandwiched between a conventional metal stripping finger and a metal hold-down member. The insert has edges extending outwardly from the metal stripping finger edges to reduce the effective width of the gap between fingers to more efficiently strip cotton bolls from cotton plants having relatively thin stalks. The portions of the insert which project beyond the metal stripping finger are sufficiently flexible to permit stripping of cotton plants with thicker stalks without barking of the plants. Since the effective gap width can change with changing plant conditions, the need to change gap-adjusting inserts is eliminated. The plastic material, which preferably is polyurethane with a durometer of approximately 93A and a low coefficient of friction, resists sap build-up and improves cotton flow over the fingers.

These and other objects, features and advantages of the present invention will become apparent to one skilled in the art upon reading the following detailed description in view of the drawings.

BRIEF DESCRIPTION OF THE DRAWINGS

FIG. 1 is a top view of a stripper finger assembly with the insert of the present invention attached thereto.

FIG. 2 is an exploded side view of the stripper finger assembly of FIG. 1.

DETAILED DESCRIPTION OF THE DRAWINGS

Figure 3:
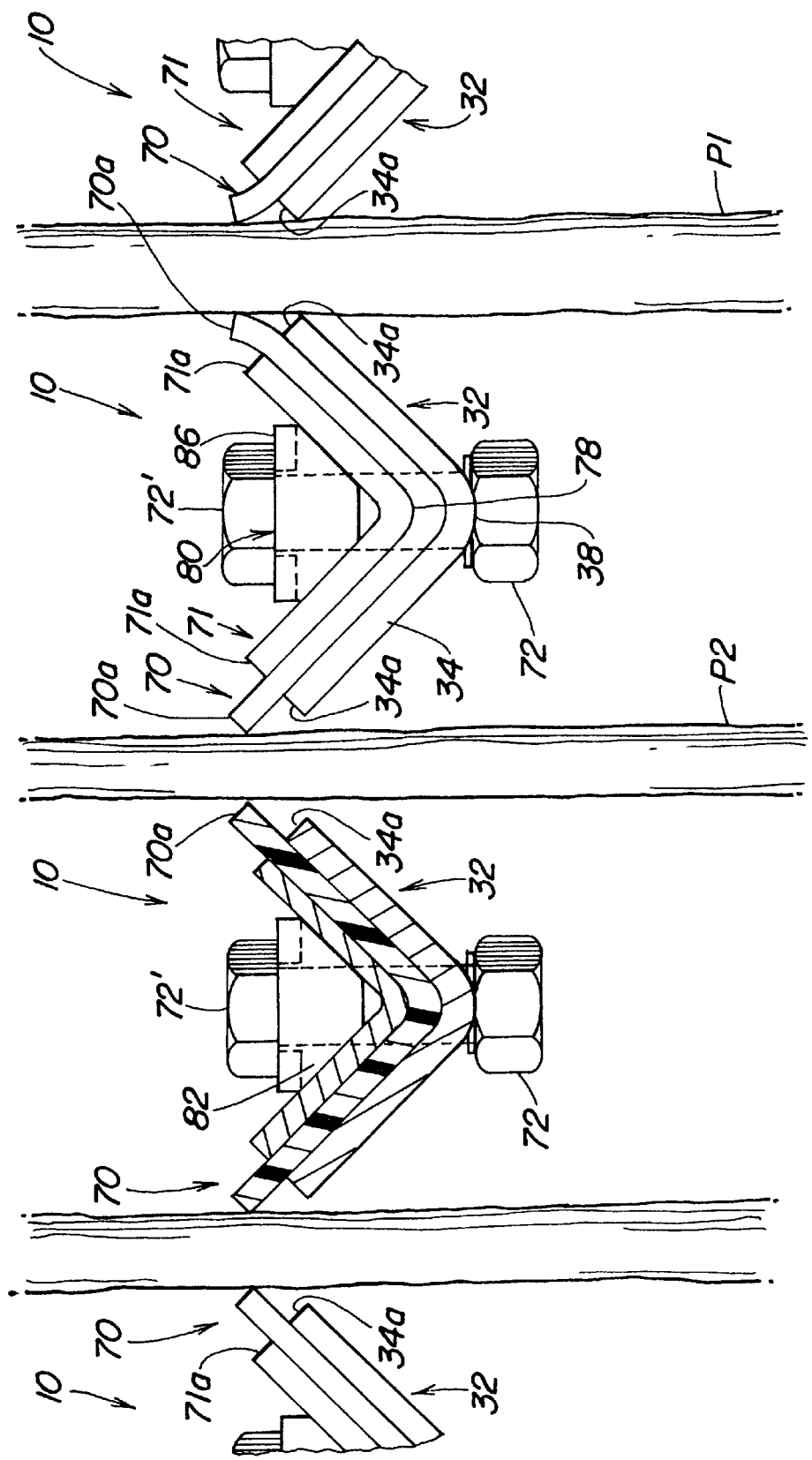
FIG. 3 is a front view looking in the direction of the stripper finger axes and illustrating the flexing action of the inserts for accommodating differing plant conditions.

Referring now to FIGS. 1 and 2, therein is shown a finger assembly 10 having a fore-and-aft extending finger mount 12. The finger mount 12 is generally planar and includes an aft down-turned mounting end 14 connected by a bracket and bolt assembly 16 to a tubular finger assembly support 20 fixed to the fingerhead of a conventional finger type cotton stripper (not shown) generally of the type described in U.S. Pat. No. 4,358,921. The finger mount 12 angles downwardly in the forward direction (to the left as shown in FIG. 1) to an upwardly directed attaching tab 24. By loosening the bolts of the assembly 16, the finger mount 12 may be adjusted transversely along the support 20. A plurality of the finger mounts are evenly spaced along the length of the support 20 to define plant receiving gaps.

Attached to each finger mount 12 is a channel-shaped stripping finger 32, preferably fabricated from an angle iron, having a V-shaped cross section with opposed angled sides 34 joined at a vertex 38 which defines the bottom of the finger. The sides 34 include outermost parallel edges 34a, which, as best seen in FIG. 3 adjacent a large-stalked plant P1, define a first gap which can accommodate the plant without substantial barking of the stalk.

The finger 32 has a tapered forward end 42 and is connected at the area of the vertex 38 at weld locations 44 to the attaching tab 24 rearwardly of the end 42. The weld locations 44 are spaced in the fore-and-aft direction for strong support and finger shape retention. The finger mount 12 supports the finger 32 with an upward angle in the rearward direction (to the right as viewed in FIG. 1). A substantial rear portion of the finger is cantilevered from the weld location area.

The tapered forward end 42 of the finger 32 is angled upwardly at 52 from the elongate axis of the remainder of the finger 32 so that bottom 56 of the end 42 approaches a generally horizontal or slightly upwardly directed attitude during normal field-working operations to help avoid digging down into the dirt. The insert 32 extends rearwardly and upwardly to an uppermost end 58 which is offset directly above the bracket and bolt assembly 16 (FIG. 1).

An upright planar fin 60 extends through a slot in the vertex of the forward end 42 and is welded on either side of the slot to define a point or divider to steer the finger to one side or the other of a plant stalk. The fin 60 also keeps cotton from falling off the fingers 32 when no stalks are coming through the gaps (i.e. when there are bare spots in the field, or when turning at the end of a pass). The fin 60 includes an aft edge 62 which extends generally from the top of the fin 60 at a right angle to the elongate axis of the finger 32 and then angles forwardly above the vertex 38 to define an insert-wedging area at 68 which, as described in detail below, forms the forward attaching area for a flexible insert 70 and insert hold-down member 71. The flexible insert 70 preferably is fabricated from a flat polyurethane sheet material of durometer greater than 83 and preferably on the order of 93A for a low coefficient of friction. The insert 70 may be formed with a V-shaped cross-section complimentary to that of the top of the finger 32. The insert 70 has a generally rectangular body portion with parallel sides 70a and a tapered forward portion 70b. The sides 70a project laterally from the edges 34a to effectively reduce the gap width to accommodate a smaller stalk plant (see P2 of FIG. 3). The insert 70 is sufficiently flexible so the edges 70a can flex (see P1 of FIG. 3) to assume a position wherein the gap width is approximately equal to the spacing between the edges 34a of the adjacent, relatively inflexible fingers 32 to accommodate the larger stalks P1 without substantial bark stripping. The high durometer material with low coefficient of friction of the insert material resists plugging, even in grassy conditions.

Forwardly of the uppermost end 58, the finger 32 is apertured (FIG. 2) at two locations along the vertex 38 which align with corresponding hole locations in a vertex 78 of the hold-down member 71. The hold-down member 71 has a cross-section conforming generally to the cross section of the finger 32 (FIG. 3) with edges 71a which are aligned with and extend parallel to the edges 34a. A tapered forward end 71b is positioned adjacent the tapered end 70b of the insert 70, and the ends 70b and 71b are wedged under the wedging area 68 of the fin 60 to hold the forward ends in place. Nuts 72 (FIG. 1) secured against the underside of the finger 32 receive bolts 72' which pass through the aligned apertures and corresponding apertures in the insert 70 to sandwich the insert in position between the top of the finger 32 and the bottom of the member 71. A clip 80 at each bolt location includes a tapered, sloped forward face 82, a similar tapered, sloped rear face 84, and a flat upper surface 86 which is apertured to receive the bolt 72'. The clips 80 provide a smooth transition area and a firm connection to avoid catching of plant material and facilitate good cotton flow. As shown in FIGS. 1 and 3, the aft ends of the insert 70 and hold-down member 71 terminate forwardly of the end of the finger 32.

Having described the preferred embodiment, it will become apparent that various modifications can be made without departing from the scope of the invention as defined in the accompanying claims.

We claim:

1. A stripper finger assembly for a cotton stripper capable of stripping cotton bolls from cotton plants planted in narrow row or broadcast configuration, the cotton plants having barked plant stalks which vary from a narrow diameter to a wide diameter greater than the narrow diameter, the finger assembly comprising:

a support;

a plurality of channel-shaped members carried by the support, the channel-shaped members having sides, the channel shaped members defining a preselected width and spaced to define first gaps through which the plant stalks with wide diameter can pass without substantial removal of the bark by the members;

a plurality of plastic inserts having flexible outermost spaced edges and defining an insert width greater than the preselected width of the channel-shaped members;

securing structures for mounting the plastic inserts on the channel-shaped members with the spaced edges extending outwardly from the sides of the members to provide effective finger gaps narrower than the first gaps for stripping cotton from plants with the narrow diameter stalks;

wherein the inserts have sufficient flexibility to flex when the wide diameter plant stalks pass between the spaced edges thereby preventing barking of the wide diameter plant stalks; and wherein the securing structure includes angle members conforming generally to the channel-shaped members and positioning the plastic inserts on the channel-shaped members.

2. The finger assembly as set forth in claim 1 wherein the flexible inserts comprise a polyurethane material.

3. The finger assembly as set forth in claim 2 wherein the polyurethane material has a durometer on the order of 93.

4. The finger assembly as set forth in claim 1 wherein the angle members sandwich the insert against the channel-shaped members.

5. The finger assembly as set forth in claim 4 wherein the insert securing members have securing edges generally coextensive with the sides of the channel-shaped members such that the spaced edges of the inserts extend outwardly from the securing edges, thereby permitting the inserts to flex sufficiently to define gaps of width generally the same as the first gaps.

6. The finger assembly as set forth in claim 4 wherein the insert securing members comprise a forward portion, and the support includes a receiving portion for slidably receiving the forward portion therein, and rear attaching members for securing the aft ends of the insert securing members against the insert to sandwich the insert.

7. In a stripper finger structure for receiving barked stalks of plants and stripping crop from the plants, the finger structure a finger support and first and second elongated, channel-shaped fingers fixed to the support with fore-and-aft extending edges, wherein the edges of adjacent fingers define a plant-receiving gap of preselected width, a stripping member comprising:

a gap-reducing insert attachable to one of the fingers for reducing the width of the gap, the insert having an edge portion projecting from the fore-and-aft extending edge into the gap;

wherein the edge portion is flexible to accommodate different sizes of stalks without stripping bark from the stalks; and further including a channel-shaped member sandwiching the gap-reducing insert against the finger.

8. A fore-and-aft extending stripper finger assembly for a cotton stripper capable of stripping cotton bolls from cotton plants planted in narrow row or broadcast configuration, the bolls movable rearwardly to a cross auger, the finger assembly comprising:

a support;

elongated fingers fixed to the support and having fore-and-aft extending edges defining a plant-receiving gap having a first effective gap width, the fingers including a central plant contact area;

a gap-varying insert attachable to the fingers for variably reducing and increasing the gap width over a range of gap widths, the range including a width approximately equal to the first gap width to a second effective gap width less than the first gap width; and wherein the insert comprises a flexible plastic strip extending outwardly from the finger edges to reduce the effective gap width to the second effective gap width, the strip flexing as it contacts the plants so that the effective gap width can increase up to approximately the first effective gap width and decrease to the second effective gap width as necessary with changes in plant conditions.

9. The finger assembly as set forth in claim 8 wherein the plastic strip extends into the central plant contact area and provides a smooth, sap-repelling surface for conveying crop rearwardly over the fingers.

10. The finger assembly as set forth in claim 8 wherein the plastic strip comprises a polyurethane material of durometer greater than 83.

11. The finger assembly as set forth in claim 10 wherein the polyurethane material has a durometer on the order of 93 to resist plugging in grassy conditions.

12. The finger assembly as set forth in claim 8 wherein at least one of the fingers is V-shaped opening upwardly, and the plastic strip is formed with a V-shaped cross-section to conform to the finger.

13. A fore-and-aft extending stripper finger assembly for a cotton stripper capable of stripping cotton bolls from cotton plants planted in narrow row or broadcast configuration, the bolls movable rearwardly to a cross auger, the finger assembly comprising:

a support;

elongated fingers fixed to the support and having fore-and-aft extending edges defining a plant-receiving gap having a first effective gap width, the fingers including a central plant contact area;

gap-reducing insert attachable to the fingers for reducing the gap; and wherein the insert comprises a flexible plastic strip extending outwardly from the finger edges to reduce the effective gap width to a second effective gap width, the strip flexing as it contacts the plants so that the effective gap width can increase up to approximately the first effective gap width with changes in plant conditions; and including an insert securing member conforming generally to the shape of one of the fingers, wherein the insert is sandwiched between the insert securing member and said one of the fingers.

14. The finger assembly as set forth in claim 13 wherein the insert securing member comprises a forward portion, and the support includes a receiving portion for slidably receiving the forward portion therein, and a rear attaching member for securing the aft end of the insert securing member against the insert to sandwich the insert.

15. The finger assembly as set forth in claim 13 further including a clip urging the insert securing member against the insert, the clip having a sloped forward face providing a smooth transition area for cotton flow over the finger.

16. A fore-and-aft extending stripper finger assembly for a cotton stripper capable of stripping cotton bolls from cotton plants planted in narrow row or broadcast configuration, the bolls movable rearwardly to a cross auger, the finger assembly comprising:

a support;

elongated fingers fixed to the support and having fore-and-aft extending edges defining a plant-receiving gap having a first effective gap width, the fingers including a central plant contact area;

gap-reducing insert attachable to the fingers for reducing the gap;

wherein the insert comprises a flexible plastic strip extending outwardly from the finger edges to reduce the effective gap width to a second effective gap width, the strip flexing as it contacts the plants so that the effective gap width can increase up to approximately the first effective gap width with changes in plant conditions;

wherein at least one of the fingers is V-shaped opening upwardly, and the plastic strip is formed with a V-shaped cross-section to conform to the finger; and including an insert securing member conforming generally to the shape of the finger and sandwiching the insert against the finger.

17. The finger assembly as set forth in claim 16 wherein the insert and the insert receiving member include forward tapered ends, and the finger includes a plant divider having a wedging area for slidably receiving the forward tapered ends therein.

* * * * *